(12) United States Patent
Brewer et al.

(10) Patent No.: US 12,405,907 B2
(45) Date of Patent: Sep. 2, 2025

(54) MULTIPLE CHANNEL MEMORY SYSTEM

(71) Applicant: Micron Technology, Inc., Boise, ID (US)

(72) Inventors: Tony Brewer, Plano, TX (US); David Patrick, McKinney, TX (US); Bryan Hornung, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 859 days.

(21) Appl. No.: 17/075,182

(22) Filed: Oct. 20, 2020

(65) Prior Publication Data

US 2025/0225087 A1    Jul. 10, 2025

(51) Int. Cl.
*G06F 13/16* (2006.01)

(52) U.S. Cl.
CPC ...... *G06F 13/1694* (2013.01); *G06F 13/1678* (2013.01); *G06F 13/1684* (2013.01)

(58) Field of Classification Search
None
See application file for complete search history.

(56) References Cited

U.S. PATENT DOCUMENTS

| | | | |
|---|---|---|---|
| 6,549,991 B1* | 4/2003 | Huang | G06F 13/1626 711/158 |
| 2010/0015732 A1* | 1/2010 | Bose | G06F 11/20 438/4 |
| 2010/0250841 A1* | 9/2010 | Ikarashi | G06F 13/1689 711/E12.001 |
| 2016/0266804 A1* | 9/2016 | Shimizu | G11C 13/0061 |
| 2018/0357009 A1* | 12/2018 | Ikarashi | G06F 3/0655 |

(Continued)

FOREIGN PATENT DOCUMENTS

| | | |
|---|---|---|
| WO | 2020117700 | 6/2020 |
| WO | 2020176291 | 9/2020 |

(Continued)

OTHER PUBLICATIONS

JEDEC. Graphics Double Data Rate (GDDR6) SGRAM Standard. Jul. 2017. JESD250.*

(Continued)

*Primary Examiner* — Nathan Sadler
(74) *Attorney, Agent, or Firm* — Schwegman Lundberg & Woessner, P.A.

(57) ABSTRACT

A system including a memory controller chiplet having a memory interface that is configured to couple the memory controller chiplet to first and second memory devices. The memory interface includes first and second memory channels having respective data widths, and configured to couple first and second I/O interfaces of the memory controller chiplet to an interface of the first memory device having a data channel width at least equal to the combined first and second memory channel widths, where the first and second memory channels have independent command/address (CA) paths; and third and fourth memory channels having respective data widths, and configured to couple third and fourth I/O interfaces of the memory controller chiplet to an interface of the second memory device having a data channel width at least equal to the combined third and fourth memory channel widths, wherein the third and fourth memory channels have independent CA paths.

23 Claims, 8 Drawing Sheets

(56) References Cited

U.S. PATENT DOCUMENTS

2019/0163565 A1        5/2019  Meaney et al.
2019/0272119 A1 *     9/2019  Brewer ............... G06F 12/0815
2019/0324928 A1 *   10/2019  Brewer ............... G06F 12/0815
2020/0226094 A1       7/2020  Teh et al.

FOREIGN PATENT DOCUMENTS

WO          2020190369              9/2020
WO     WO-2021064433 A1 *    4/2021   ......... G06F 12/0207
WO          2022115167              6/2022

OTHER PUBLICATIONS

"International Application Serial No. PCT US2021 053812, International Search Report mailed Jul. 27, 2022", 4 pages.
"International Application Serial No. PCT US2021 053812, Written Opinion mailed Jul. 27, 2022", 5 pages.

* cited by examiner

← 500

| ACCESS SIZE (BYTES) | 2X16 MODE RANDOM ACCESS BANDWIDTH (GB/S) | 4X8 MODE RANDOM ACCESS BANDWIDTH (GB/S) |
|---|---|---|
| 8 | 8 | 16 |
| 16 | 16 | 32 |
| 32 | 32 | 64 |
| 64 | 64 | 64 |
| 128 | 64 | 64 |
| 256 | 64 | 64 |

FIG. 5

MULTIPLE CHANNEL MEMORY SYSTEM

STATEMENT REGARDING GOVERNMENT SUPPORT

This invention was made with U.S. Government support under Agreement No. HR00111890003, awarded by DARPA. The U.S. Government has certain rights in the invention.

BACKGROUND

Chiplets are an emerging technique for integrating various processing functionalities. Generally, a chiplet system is made up of discreet modules (each a "chiplet") that are integrated on an interposer, and in many examples interconnected as desired through one or more established networks, to provide a system with the desired functionality. The interposer and included chiplets may be packaged together to facilitate interconnection with other components of a larger system. Each chiplet may include one or more individual integrated circuits, or "chips" (ICs), potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems may include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics may be assembled in a modular manner to provide an assembly providing desired functionalities. Chiplet systems can also facilitate adaptation to suit needs of different larger systems into which the chiplet system will be incorporated. In an example, IC's or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, various embodiments discussed in the present document.

FIG. 5 illustrates a table of random-access memory bandwidths for a chiplet system, in accordance with some examples described herein.

DETAILED DESCRIPTION

FIG. 1, described below, offers an example of a chiplet system and the components operating therein. Examples of the present disclosure are directed to increasing the bandwidth, or the utilization, of random-access memory devices in such chiplet systems. In an example, a chiplet system includes a memory controller chiplet that is coupled, such as by one or more memory channels, to a set of one or more memory devices, such as one or more double data rate synchronous random-access memory (DDR SDRAM) devices. As described in more detail later herein, the memory controller may be configured to establish independent memory channels of a selected width which are coupled to a memory interface having a width at least twice the selected width of the memory channels. This form of memory system may be implemented to facilitate parallel accesses to respective relatively smaller memory regions to provide enhanced memory system performance, particularly in the case of smaller random memory accesses.

For example, the memory controller may be configured to execute random access memory operations (hereinafter. "memory access operation(s)") to access the memory devices. Such memory access operations can include one or more commands to activate a row of a memory array in a memory device followed by a command to write data to, or to read data from, the activated row. Some memory devices require that, after the execution of a row active and a first read or write command, a new row in a memory device be activated before a subsequent read or write command is executed or processed. Accesses to these memory devices, however, are generally prescribed by protocols that specify timing requirements that can limit the rate at which row-activate commands are issued to a device. In the case of DDR SDRAM devices, such protocols include a row-activate to row-activate (hereinafter, "activate-to-activate") delay requirement that prescribes a minimum length of time that must expire after the issuance of a first row activate command before a second or subsequent row activate command is issued. Adhering to this activate-to-activate delay requirement can cause idle data cycles on memory channel, or a data bus associated with a memory channel, used to communicate with a memory device. Such idle cycles can be generated when, for example, a memory access operation for fewer bytes than the prefetch size of the memory device (e.g., the number of bytes prefetched in response to a single memory access operation). In the context of chiplet systems, such idle cycles can reduce the available bandwidth provided by a memory device, thereby reducing memory device utilization.

Figure 1A:
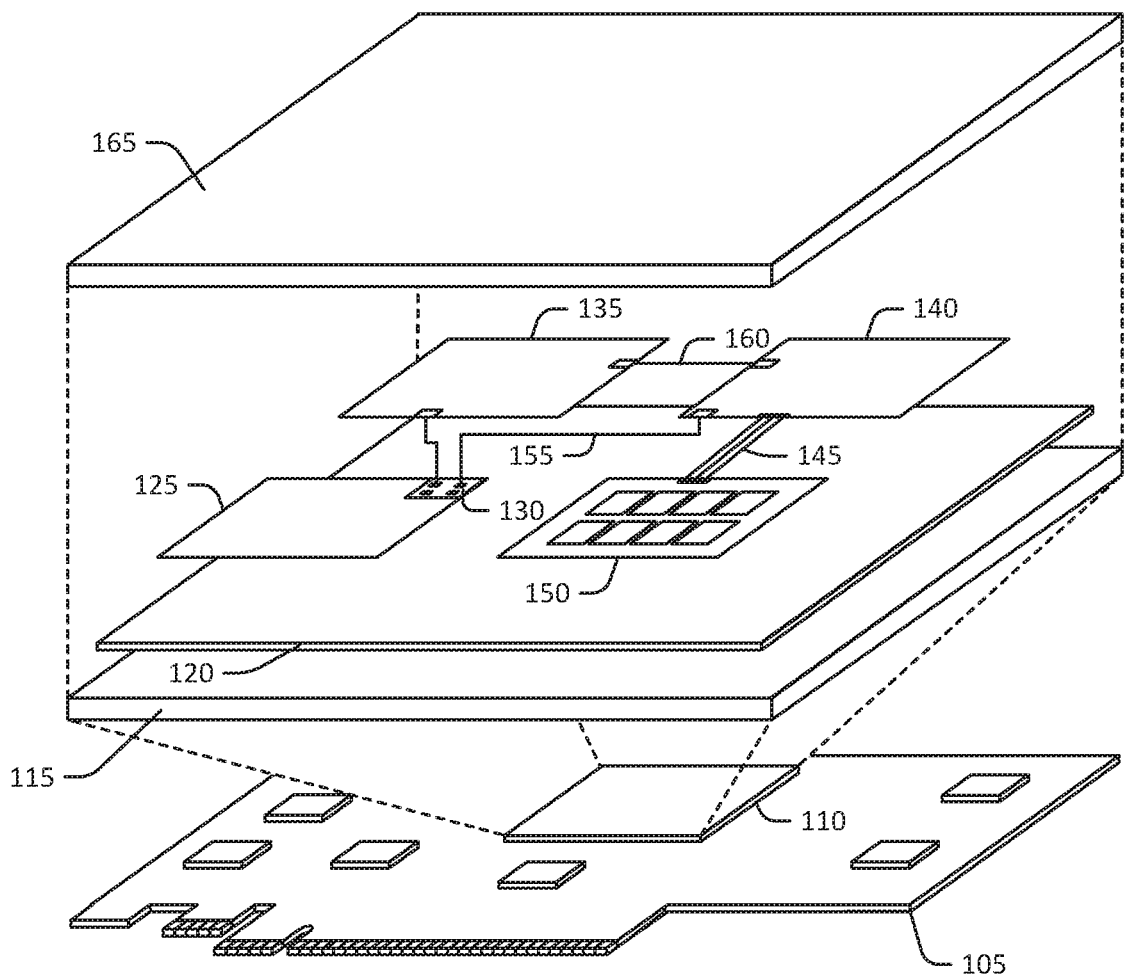
FIGS. 1A-1B illustrate an example of a chiplet system, in accordance with some examples described herein.
Figure 1B:
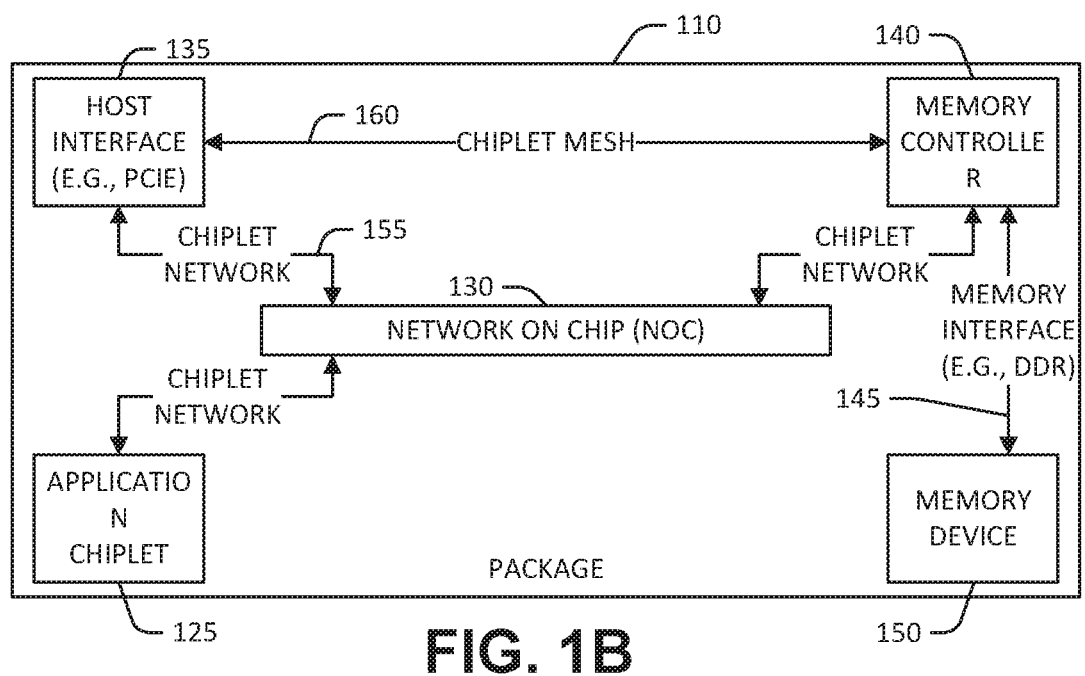

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems may include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 may be included on the application chiplet 125. In an example, NOC 130 may be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os) or have a non-symmetrical number of transmitters and receivers (e.g., either all transmitters or all receivers). The channel can act as an AIB master or slave depending on which chiplet provides the master clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR6), can also be used to interconnect chiplets. Connection of a chiplet system or individual chiplets to external devices (such as a larger system can be through a desired interface (for example, a PCIE interface). Such an external interface may be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is based on such an industry convention and enhanced according to the techniques described herein.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh may be controlled by a host processor or of a memory controller at some times, and at other times controlled by the DRAM memory device, or by logic associated with one or more DRAM devices, such as an interface chip (in an example, a buffer).

Atomic operations are a data manipulation that, for example, may be performed by the memory controller chiplet 140. In other chiplet systems, the atomic operations may be performed by other chiplets. For example, an atomic operation of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic operations avoid transmitting the data across the chiplet network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets may be provided. In an example, these memory device chiplets may each implement one or multiple storage technologies. In an example, a memory chiplet may include, multiple stacked memory die of different technologies, for example one or more SDRAM devices stacked or otherwise in communication with one or more DRAM devices. Memory controller 140 may also serve to coordinate operations between multiple memory chiplets in chiplet system 110; for example, to utilize one or more memory chiplets in one or more levels of cache storage, and to use one or more additional memory chiplets as main memory. Chiplet system 110 may also include multiple memory controllers 140, as may be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
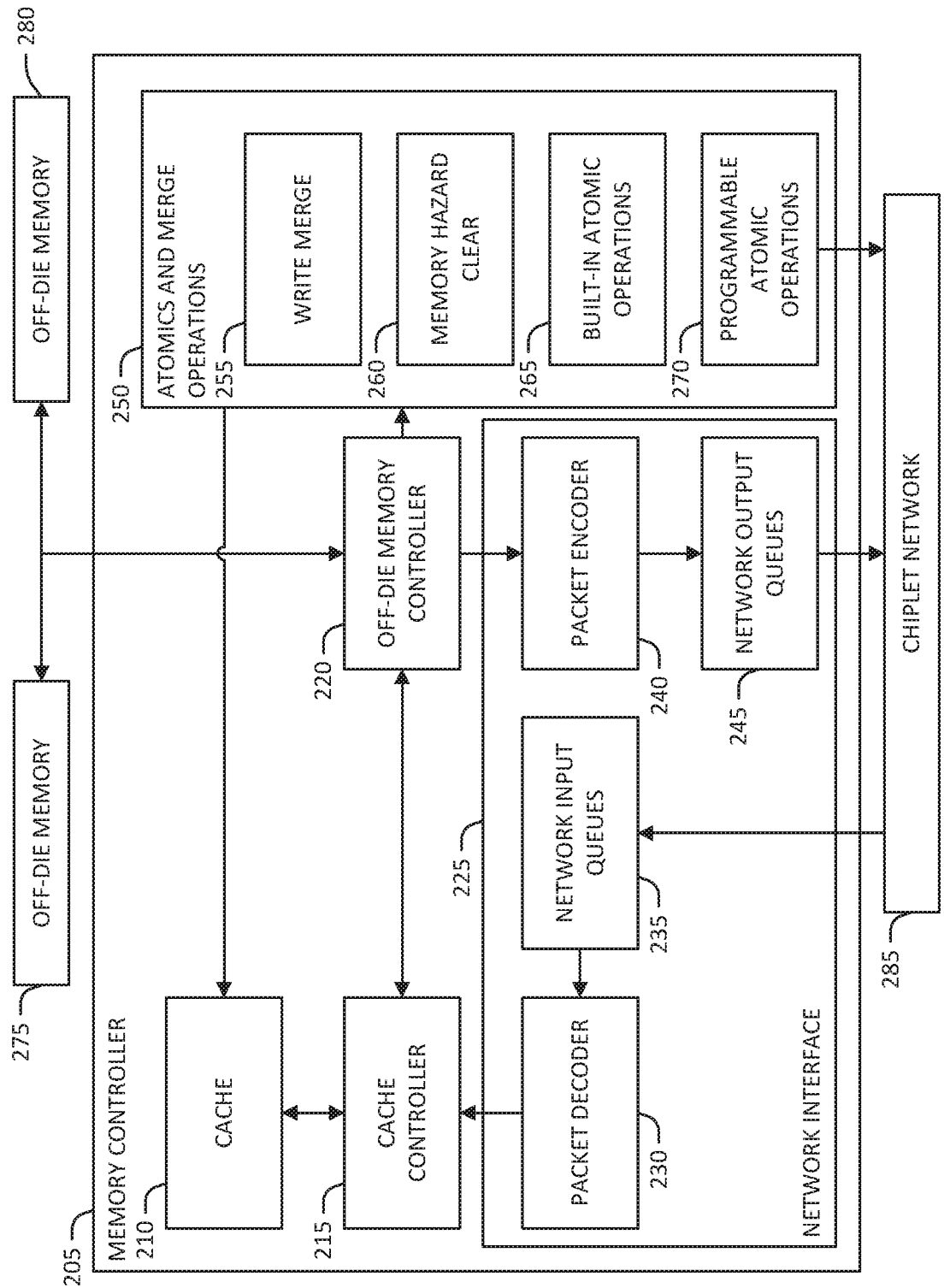
FIG. 2 is a block diagram of an example of a memory controller chiplet, in accordance with some examples described herein.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomic and merge units 250. Members of this set can include, for example, a write merge unit 255, a memory hazard unit 260, built-in atomic unit 265, or a PAU 270. The various components are illustrated logically, and not as they necessarily would be implemented. For example, the built-in atomic unit 265 likely comprises different devices along a path to the off-die memory. For example, the built-in atomic unit 265 could be in an interface device/buffer on a memory chiplet, as discussed above. In contrast, the programmable atomic unit 270 could be implemented in a separate processor on the memory controller chiplet 205 (but in various examples may be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge unit 250, and for input to the cache controller 215 (e.g., a memory side cache controller).

In the example configuration, cache controller 215 is directly coupled to the cache 210, and may be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge unit 250, or both. As noted above, one or more levels of cache may also be implemented in off-die memories 275 or 280; and in some such examples may be accessed directly by cache controller 215. Data read by the off-die memory controller 220 can be cached in the cache 210 by the cache controller 215 for later use.

The atomic and merge unit 250 are coupled to receive (as input) the output of the off-die memory controller 220, and to provide output to the cache 210, the network communication interface 225, or directly to the chiplet network 285. The memory hazard unit 260, write merge unit 255 and the built-in (e.g., predetermined) atomic unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operation, the built-in atomic unit 265 receives the request and reads data, either from the write merge unit 255 or directly from the off-die memory controller 220. The atomic operation is performed, and using the write merge unit 255, the resulting data is written to the cache 210, or provided to the network communication interface 225 to encode and prepare a response or return data packet for transmission on the chiplet network 285.

The built-in atomic unit 265 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and optionally up to 32-bytes of data. The atomic operation performs the read-modify-write to a cache memory line of the cache 210, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as comparatively simple, single cycle, integer atomics-such as fetch-and-increment or compare-and-swap-which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic operation unit 265 to perform the requested atomic operation. Following the atomic operation, in addition to providing the resulting data to the packet encoder 240 to encode outgoing data packets for transmission on the chiplet network 285, the built-in atomic operation unit 265 provides the resulting data to the write merge unit 255, which will also write the resulting data to the cache 210. Following the writing of the resulting data to the cache 210, any corresponding hazard bit which was set will be cleared by the memory hazard unit 260.

The PAU 270 enables high performance (high throughput and low latency) for programmable atomic operations (also referred to as "custom atomic transactions" or "custom atomic operations"), comparable to the performance of built-in atomic operations. Rather than executing multiple memory accesses, in response to an atomic operation request designating a programmable atomic operation and a memory address, circuitry in the memory controller chiplet 205 transfers the atomic operation request to PAU 270 and sets a hazard bit stored in a memory hazard register corresponding to the memory address of the memory line used in the atomic operation, to ensure that no other operation (read, write, or atomic) is performed on that memory line, which hazard bit is then cleared upon completion of the atomic operation. Additional, direct data paths provided for the PAU 270 executing the programmable atomic operations allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operations. When provided with the extended instruction set for executing programmable atomic operations, the PAU 270 can be embodied as one or more hybrid threading processors. In some example embodiments, the PAU 270 provides barrel-style, round-robin instantaneous thread switching to maintain a high instruction-per-clock rate.

Programmable atomic operations can be performed by the PAU 270 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the predetermined atomic operations, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operation. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache control circuit 215.

In the discussion that follows, the examples of the present disclosure will be described in terms of memory read operations. Such discussions, and the techniques described herein, are equally applicable to memory write operations.

As described herein, activate-to-activate delay or timing requirements prescribed by the memory access protocols of some memory devices can cause idle data cycles that reduce or limit the bandwidth or utilization of a memory channel used to communicate with devices. The activate-to-activate delay requirement can limit the rate at which rate at which a memory controller can transmit memory access operations to a memory device. In an example, DDR memory access protocols include a different memory bank row-to-row (or different memory bank activate-to-activate) delay (tRRD) that is indicative of the length of time a memory controller must wait after issuing a first row-activate command to active a row in a memory array before the controller can issue a subsequent row-activate command to access another row in a different bank. The length of time can manifest as one or more idle cycles in which the memory controller is unable to receive or transmit data over data bus of a memory channel. A memory controller, in various examples, can improve the available bandwidth or utilization of a memory device by decreasing the amount of the idle cycles or by, equivalently, increasing the ratio of utilized data cycles to idle data cycles for a memory channel.

Examples of the present disclosure include methods, systems, memory interfaces, and devices that improve the available bandwidth of memory devices in chiplet systems through use of a memory controller providing separate data and command/address inputs to different sub-portions (for example, different halves) of multiple memory devices (for example, two memory devices) having an industry standard memory interface). Some memory devices, such as for example, GDDR6 SDRAM devices conventionally operate independently with a 16-bit channel width (i.e., in "×16 mode"); but have a capability of operating in a mode (which in the case of GDDR6 devices is termed "clamshell mode"), in which command/address ("CA") are shared between two memory devices to allow operation of each memory device with an 8-bit channel (i.e., in "×8 mode"). For purposes of the present discussion GDDR6 operation is used as an example of the new subject matter, though the techniques described herein may be applied to other industry standard interfaces, as may be desired.

In the example of the GDDR6 clamshell mode while there are four separate ×8 data channels, the CA signals of a ×16 mode device are distributed to each memory device. As a result, while the data channel is ×8 bits, due to the shared CA signals, the reads are of 16 sequential addresses split between the two memory devices. While some advantages are obtained by enabling the ×8 clamshell mode, due to the sequential reads resulting from the shared CA signals, the memory accesses are not independent, and thus as a result can be inefficient, particularly for smaller random memory accesses.

To address this inefficiency the present description addresses a memory controller configured to provide independent data and CA signals to respective sub-portions of wider industry standard memory interface. In an example, four independent 8-bit hardware memory channels of a memory controller are connected to two memory devices, such as GDDR6 SDRAM devices through a conventional ×16 GDDR6 interface. Each memory device provides two independently addressable I/O interfaces configurable to operate as two 8-bit channel (hereinafter, "×8 mode") to access independent (e.g., independently addressable) memory arrays of the device.

The hardware memory channels include any circuit that is configured to couple or connect a memory controller to a memory device according to a prescribed memory interface protocol. In an example, a hardware memory channel includes signals, encoding and decoding circuits, conditioning circuits, conductive traces that are disposed on a memory controller chiplet, a memory interface chiplet, or another chiplet system component. In another example, the hardware memory channel includes a logical connection established by these circuits between a memory controller and a memory device. A independently addressable I/O interface of a memory device (hereinafter, "device I/O interface") includes, in various examples, any circuit that is associated with, or that is integrated within, a memory device to allow parallel or concurrent (e.g., within an activate-to-activate period or tRRD delay) access to independent memory arrays or other subdivisions of the memory device. Each 8-bit hardware memory channel is connected to a device I/O interface configured in a ×8 mode using a separate or distinct set of electrical conductors or traces (hereinafter. "signals" or "signal lines"), such as for conducting separate column address signals over the 8-bit channels to the I/O interfaces.

In an example, the two memory devices are each configured to internally prefetch a specified number of bytes of data for each memory access operation (e.g., a row activation command followed by a read command) received from, or issued by, the memory controller. Each memory device, for example, prefetches 64-bytes of data responsive to receiving a command to activate and read a row of memory. Half of the prefetched data is allocated to each device I/O interface of each memory device such that, for example, 32-bytes of data is provided by each interface responsive to each memory access operation received from the memory controller.

If a memory controller is coupled to a memory device using a conventional ×16 hardware memory channel, such as in the standard GDDR6 configuration with two independent ×16 channels (or I/O) interface configuration mode, the memory controller receives, in various examples, the prefetched data from each device I/O interface in two 16-byte data bursts. If the data size of the memory access operation is less than or equal to the size of the prefetched data allocated to each device I/O interface, the memory access operation is generally completed before the activate-to-activate delay for the memory device is satisfied. The memory controller, however, may not issue a new row-activate and read command to a memory device as part of a new memory access operation until the activate-to-activate delay for the device is satisfied. As a result, the data bus for the hardware memory channel the connects the memory controller to the memory device will remain idle for the time it takes the memory device to process the subsequent row-activate and read commands, such as commands issued on the clock cycle following the expiration of the activate-to-activate delay. It would be advantageous if the memory controller or the memory device was able transfer data during this idle time.

If a memory controller is coupled to a memory device using a ×8 hardware memory channel, such as in the GDDR6 two independent ×8 channel or I/O configuration mode, the memory controller receives prefetch data for each channel in four 8-byte data busts. The data transfer in this configuration takes more cycles to complete than the data transfer in the ×16 configuration. The additional time used to transfer the data over the ×8 channel, however, increases the likelihood that the channel is utilized until data is available from a subsequent memory access operation issued at the expiration of the activate-to-activate delay. As a result, the ×8 channel experiences fewer idle cycles than the by ×16 channel for the same set of memory access operations. Using four 8-bit hardware memory channels, such that each ×8 devices I/O interface of the two memory devices is coupled to the memory controller through the four channels, to concurrently process or service memory access operations (e.g., in parallel or within a activate-to-activate period or tRRD delay) produces an aggregate random memory access bandwidth that is higher than the random-access bandwidth of two ×16 memory channels coupled to ×16 device I/O interfaces of the memory devices. In an example, using all four 8-bit hardware memory channels to concurrently process or service 8, 16, or 32-byte memory access operations produces aggregate random memory access bandwidths that are larger, and in some cases double, the random-access bandwidth of two ×16 memory channels.

Figure 3:
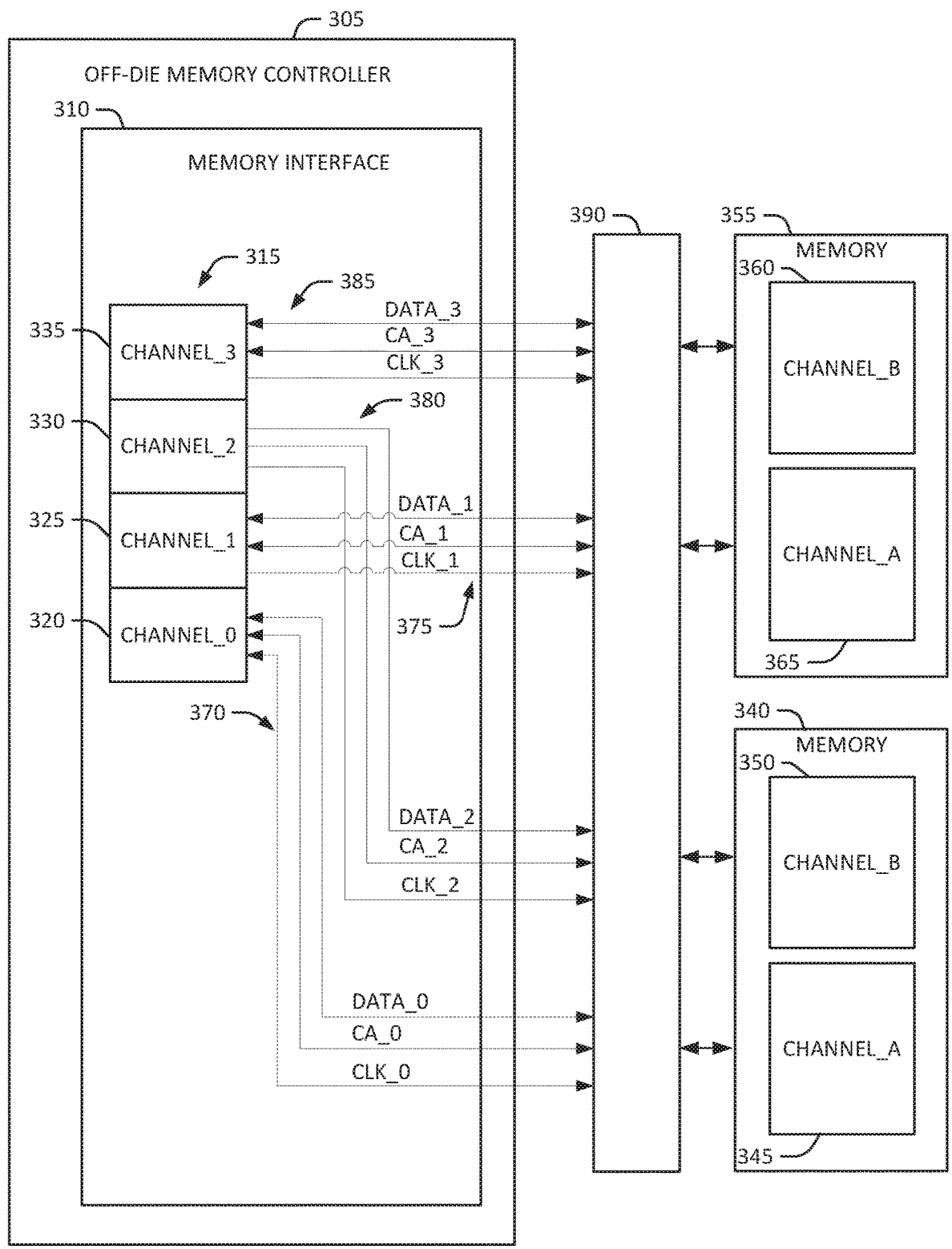
FIG. 3 is an illustrates an example of a chiplet system having a memory interface for connecting a memory controller to random access memory, in accordance with some examples described herein.

FIG. 3 is an illustrates an example of a chiplet system 300 having a memory controller 305 and a GDDR6 physical interface 390 for connecting the memory controller to memory devices 340 and 355, in accordance with some examples described herein. The chiplet system 300 can be a component of a larger chiplet system, such as the chiplet system 110. In an example, the chiplet system 300 is configured to provide, such as through operation of the memory controller 305, access to one or more memory devices, such as the memory device 150 or the off-die memory 275 and 280. The GDDR6 physical interface 390 is a standard or conventional GDDR6 interface (e.g., an interface that supports on implements the GDDR6 memory device protocol) to memory devices 340 and 355. The GDDR6 physical interface 390, in various examples, include independently addressable interfaces to each channel or independent memory area of memory devices 340 and 355.

The memory controller 305 is an example of the memory controller 140, 205, or 220. In an example, the memory controller 305, includes at least four sets of independent or distinct address pins. Each set of address pins, in various examples, include a set of column address pins, such as for a GDDR6 based SDRAM memory device, and may be configured to transmit address and command signals to the memory interface 310. In an example, each set of address pins is used to concurrently (e.g., independently within a activate-to-activate period or tRRD delay period) transmit different address and command signals to the memory interface 310. In another example, the memory controller 305 includes independent clock and data pins for each set of address pins. In yet another example, the memory controller 305 includes one or more hardware circuits or software applications that are configured to transmit memory access commands over one or more of the at least four sets of independently addressable address pins. In an example, the hardware circuits or software applications are configured to concurrently (e.g., within an activate-to-activate period or tRRD delay period) transmit a distinct memory access command to each set of independently addressable address pins. In an example, the memory access commands may be configured to access different or unrelated areas of memory in a memory device. In an example, the memory access commands may be configured to access correlated or related areas of memory in different storage arrays of a memory device. In yet another example, the memory controller issues the memory access commands according to different clocks or clocks cycles, such that consecutively issued commands may be staggered in different clock cycles. The memory controller can, for example, issue one or more memory access commands within an activate-to-activate delay period of another issued memory access command.

The memory controller 305 can include, among other things, the memory interface 310. As shown in FIG. 3, the memory interface 310 can include channel components 315 and bus signals 370, 375, 380, and 385. In an example, the channel components 315 include a set of four independently addressable channel components 320, 325, 330, and 335.

In an example, the channel components 315 include one or more hardware circuit or software applications to enable the memory interface 310 to couple the memory controller 305 to memory devices 340 and 355. The channel components 315, in another example, include timing circuits, signal conditioning circuits, and digital logic circuits that couple memory access signals generated by the memory controller 305 to memory devices 340 and 355 in accordance with timing, signaling, and logic or sequence requirements of a protocol for interfacing with the memory devices. Such protocol, in an example, include the timing or delay criteria for activate-to-activate operations (hereinafter. "tRRD" or "tRRD delay"). Such protocol, in another example, includes an industry standard protocol for interfacing and communicating with GDDR6 memory devices, such as SDRAM devices.

In an example, each channel component 320, 325, 330, and 335 include dedicated timing circuits, signal conditioning circuits, and digital logic circuits that couple memory access signals generated by the memory controller 305 to the memory devices 340 and 355 in accordance with timing, signaling, and logic or sequence requirements of a protocol for interfacing with the memory devices. Each channel component 320, 325, 330, and 335 may be physically or logically coupled to separate I/O interfaces or pins on the memory controller 305.

The bus signals 370, 375, 380, and 385 include conductive traces, such as metallic traces on a chiplet substrate or interposer, that physically connect an I/O interface of a memory device to the memory interface 310. In an example, the bus signals 370 include a set of data conductors (hereinafter, "data signals") DATA_0 and a set of address conductors (hereinafter, "address signals") CA_0 that are connected to channel component 320 and to CHANNEL_A 345 of memory device 340 to form a first hardware memory channel. In another example, the bus signals 375 include a data signals DATA_1, an address signals CA_1 that are connected to channel component 325 and to CHANNEL_A 365 of memory device 355 to form a second hardware memory channel. In another example, the bus signal 380 include a set of data signals DATA_2, a set of address signals CA_2 that are connected to channel component 330 and to CHANNEL_B 350 of memory device 340 to form a third hardware memory channel. In yet another example, the signal conductors 385 include a set of data signals DATA_3, a set of address signals CA_3 that are connected to channel component 335 and to CHANNEL_B 360 of memory device 355 to form a fourth hardware memory channel. In an example, each set of data signals form a data bus having a specified data width, such as 8-bit wide data bus, for communicating data over the memory interface 310. The address signals are configured communicate memory access command and address information from the memory controller 305 to the memory devices 340 and 355. In some examples each hardware memory channel includes a clock signal (e.g., CLK_0, CLK_1, CLK_2, or CLK_3) to enable independent timing between hardware memory channels. In a more specific example, the clock signals are used to synchronize access to the memory devices. Each set of data, address, and clock signals are independent of, or electrically isolated from, other sets of data, address, and clock signals, such that, within a activate-to-activate period or tRRD delay period, a first hardware memory channel can communicate a memory access command that is independent of a second memory access command communicated by a second set hardware memory channel.

The memory device 340 and 355 include, in various examples, any set of two or more memory devices that reach are configured to provide access, such as through the GDDR6 physical interface 390, to two independently addressable memory regions of each memory device, such as a CHANNEL_A 345 and CHANNEL_B 350 or CHANNEL_A 365 and CHANNEL_B 360, for providing memory read, write, or modify access to memory arrays of the memory devices. In an example, each memory device 340 and 355 is configurable to adjust the data bus width of an interface to each independently addressable region of the memory devices from a first bus width, such as 16-bits, to a second bus width, such as 8-bits.

In some examples, the memory devices 340 and 355 are configured in a clamshell configuration where one device is mounted on top of the other device such that the devices share bus signals (e.g., address and command signals), such as specified in the GDDR6 specification. In such a configuration, the memory interface 310 provides separate chip select or chip enable signals to each memory device. The memory controller is configured to issue independently addressable memory access commands to each for CHANNEL_A 345 and CHANNEL_B 350 or CHANNEL_A 365 and CHANNEL_B 360 using the chip select and the shared bus signals.

Figure 4A:
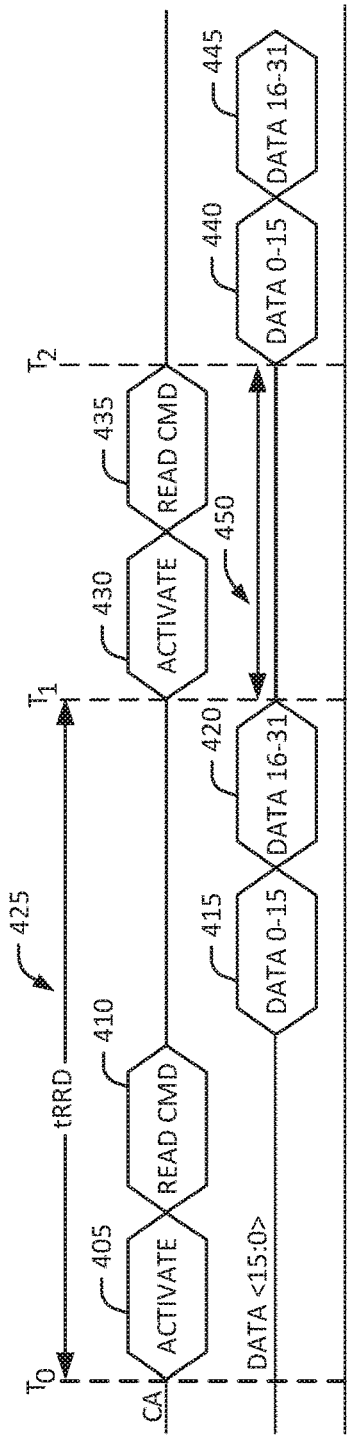
FIG. 4A-4B illustrate examples of timing diagrams of associated with operations of a chiplet system to access to random access memory, in accordance with some examples described herein.
Figure 4B:
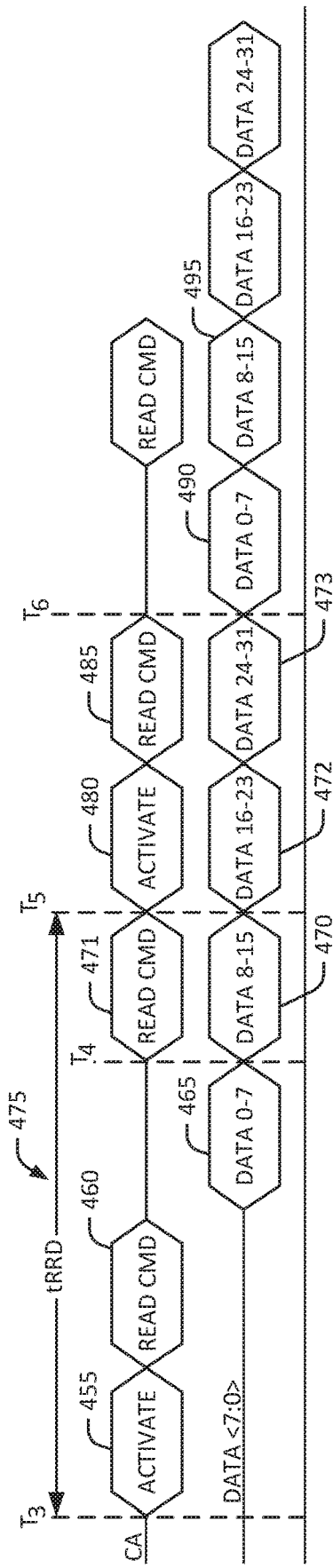

FIG. 4A-4B illustrate examples of timing diagrams for accessing random access memory, in accordance with some examples described herein.

FIG. 4A illustrates timing diagrams for memory read operations executed by a memory controller that is configured to interface with a memory device, such as a GDDR6 device, over a 16-bit hardware memory channel. In an example, the memory operations executed by the memory controller that is coupled to a 16-bit device I/O interface or a hardware memory channel of the memory device. As shown in FIG. 4A, a first memory read operation includes a first row-activate command 405 issued at time $T_0$, followed by a first read command 410. The memory device provides, responsive to the receiving the first row-activate 405 and first read command 410, 32-bytes of data in first and second data 16-byte bursts 415 and 420. The memory controller issues a second memory read operation at time $T_1$ after an activate-to-activate delay 425, such as prescribed by the tRRD timing requirement of the GDDR6 device protocol or specification. The second read operation includes a second row-activate command 430 followed by a second read command 435. The data requested in the second memory read operation is provided in two 16-byte data bursts 440 and 445 beginning at time $T_2$ after a delay 450. The delay 450 is indicative of one or more cycles in which the data bus of the 16-bit device memory channel, or the data bus of hardware memory channel coupled to the 16-bit device I/O interface of the memory device, is idle or not conveying data.

FIG. 4B illustrates timing diagrams for memory read operations executed by a memory controller, such as the memory controller 140, 205, or 305, to read an area of memory of a memory device. The memory read operations, in various examples, are executed to access read an area of memory of a GDDR6 device over an 8-bit hardware memory channel, as described herein. In an example, the memory operations are serviced through an 8-bit device I/O interface of the memory device according to the techniques described herein. As shown in FIG. 4B, the memory controller issues a first memory read operation that includes a first row-activate command 455 issued at time $T_3$, followed by a first read command 460. The memory device provides, responsive to the receiving the first row-activate 455 and first read command 460, 16-bytes of data in first and second data 8-byte bursts 465 and 470. A second memory read command 471 is issued at time $T_4$, prior to the expiration of the activate-to-activate delay 475, to obtain a remaining 16-bytes of data associated with the first memory read operation. In an example, the activate-to-activate delay 475 is the same timing delay as the activate-to-activate delay 425. The memory device provides the remaining 16-bytes of data in 8-byte data bursts 472 and 473. A second memory read operation is issued at time $T_4$ after the activate-to-activate delay 475, such as prescribed by the tRRD timing requirement of the GDDR6 device protocol or specification. The second read operation includes a second row-active command 480 followed by a third read command 485. The data requested in the second memory read operation is provided in two 8-byte data bursts 490 and 495 beginning at time $T_6$. Notably, the number of idle cycles on the data bus is reduced due to the data bursts 472 and 473 provided responsive to the second read command 471. This increased utilization of the data bus results in increased aggregate available GDDR6 memory bandwidth, such for small memory read operations executed using four 8-bit a memory interface such as described in FIG. 3.

FIG. 5 illustrates a table 500 of random-access memory bandwidths for a chiplet system, in accordance with some examples described herein. More specifically, FIG. 5 illustrates random memory access bandwidth of a pair of memory devices, such as the GDDR6 devices described herein, that interface with a memory controller using two 16-bit channels to process memory access operations, such as described herein. FIG. 5 also illustrates random memory access bandwidth of a pair of memory devices that interface with a memory controller in using four 8-bit channels to process memory access operations, such as described in herein. As shown in FIG. 5, random memory access bandwidth of the four 8-bit channel configuration is twice the random memory access bandwidth of the two 16-bit channel configuration for memory access data sizes that are 32 bytes (e.g., the standard prefect size of each channel of the GDDR6 device) or less.

Figure 6:
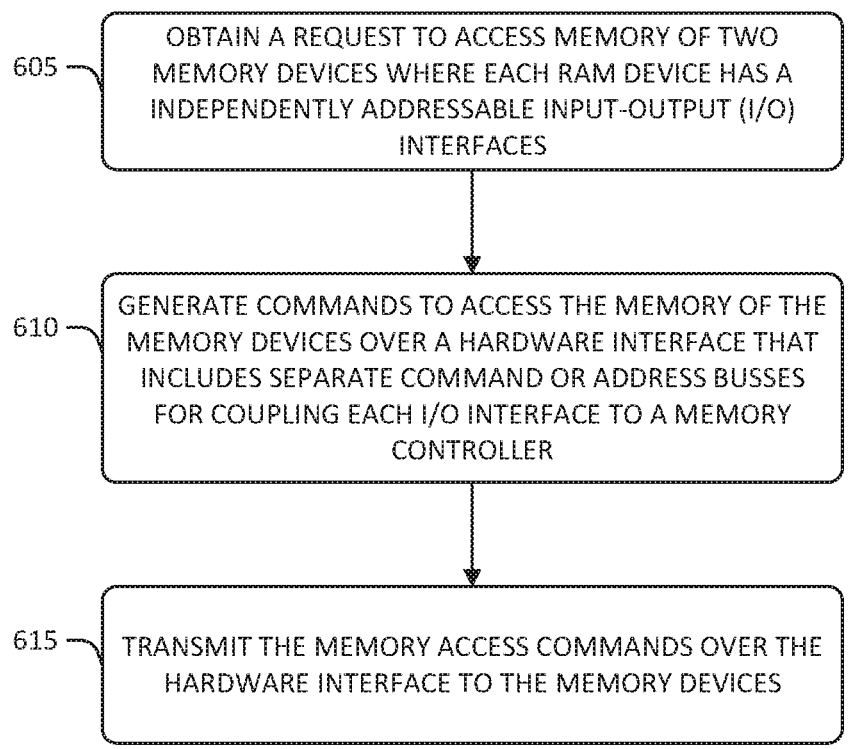
FIG. 6 illustrates an example of a process for operating a memory controller in a chiplet system, in accordance with some examples described herein.

FIG. 6 illustrates an example of a process 600 for operating a memory controller, in accordance with some examples described herein. In an example, the process 600 is executed by a memory controller, such as the memory controller 305, to process memory access operations over a memory interface, such as the interface 310, to a pair of memory devices, such as the GDDR6 based devices described herein. In an example, the memory interface includes four 8-bit hardware memory channels that are each connected 8-bit interfaces of the GDDR6 physical interface 390 or of the memory devices, such as described in. Each 8-bit hardware memory channel have independent or distinct column access lines, such as for conveying memory access commands or addresses between the memory controller to the memory devices.

At 605, the memory controller obtains a request to access memory of two memory devices. In an example, the request includes one or more requests to read, write, or modify one or more bytes of memory of the two memory devices. The requests are, in some examples, obtained from one or more chiplets that are coupled through a chiplet network to a memory controller chiplet that includes the memory controller. The memory devices include, in various examples, GDDR6 devices that each include two or more independently addressable hardware memory channels.

At 610, the memory controller generates memory access commands to access the memory devices, such as through, or over, the hardware interface 310. The memory access commands include, in some examples, one or more row activate, read, or write command. In an example, generating the memory access commands include partitioning a memory access request into one or more sets of row activate and read or write commands and allocating each set of commands for parallel or independent transmission over to the memory devices. In an example, the memory access request is partitioned on four sets of memory access commands, where each set of commands includes a row-activate command and one or more memory read or memory write command. Additionally, in some examples, each set of memory access commands includes address information for independently accessing a memory device over one of four hardware memory channels that couples the pair of memory devices to the memory controller.

At 615, the memory controller transmits each set of memory access commands over the memory interface to the memory devices. In an example, transmitting the set of memory access commands include transmitting a row-activate command over a first hardware memory channel followed by transmitting a memory read command over the same channel to, for example, read a data size of 32-bytes or less. Transmitting the set of memory access commands can also include, responsive to transmitting the read command, receiving the one or more data bursts, such as over an 8-bit data bus, that include a first set of bytes of the requested data. Such transmitting can further include transmitting, over the first memory channel, a second read command to obtain another one or more data bursts including a second set of bytes of the requested data, where the second read command is transmitted before expiration of the activate-to-activate delay for the memory devices. Such transmitting can then include transmitting a second set of memory access commands to the first memory channel after expiration of the activate-to-activate delay. The memory controller, in various examples, transmits four or more sets of memory access commands to in parallel (e.g., within the same clock cycle or within an activate-to-activate tRRD delay of any of any one of the set of memory access commands) to the memory devices, as described herein. In an example, each set of memory access commands include column addresses that is different from, or independent of, the column addresses associated with the other sets of memory access commands.

The process 600 can further include any additional steps that are suitable for implementing the techniques described herein. In an example, the process 600 includes determining that a set of memory access operations are for a data size that is less than or equal to 32-bytes, and responsive to the determination, generating and transmitting memory access commands to perform the memory access operation over four independently addressable 8-bit channels. In an example, such transmitting includes transmitting the address and command information over shared bus while using separate chip select or chip enable signals to access, or to direct that the commands to, each memory device.

Figure 7:
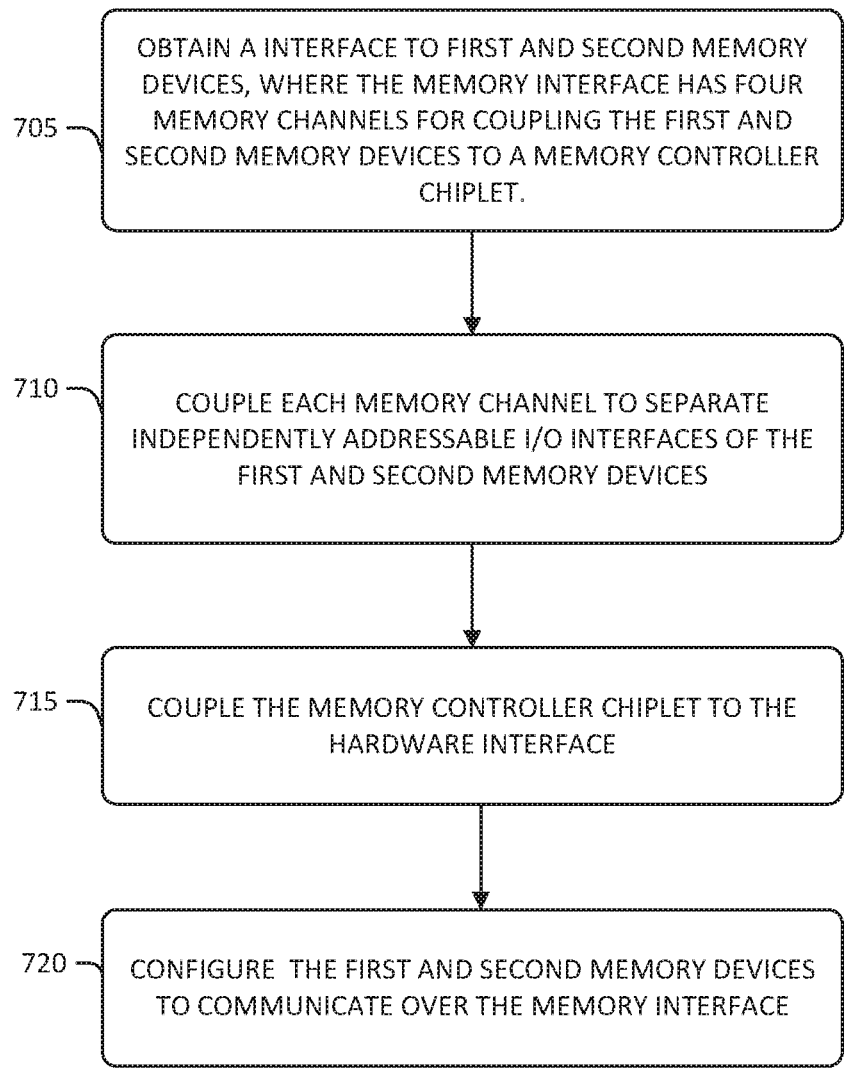
FIG. 7 illustrates an example of a process for making a chiplet system, in accordance with some examples described herein.

FIG. 7 illustrates an example of a process 700 for making a chiplet-based system, in accordance with some examples described herein. At 705, a hardware interface, such as the memory interface 310, to two memory devices is formed. The hardware interface includes four hardware memory channels for coupling a memory controller chiplet to the two memory devices (e.g., two GDDR6 memory devices, such as memory device 340 and 355). Each hardware memory channel includes distinct or independent sets of column address and data signals or lines, such that column address or data signals are not shared between channels. In some examples, each hardware memory channel includes a distinct clock signal. In some examples, each hardware memory channel includes a data bus (e.g., data signals or data lines) that has a bus width of at most a quarter as many bits are there are bytes perfected for a device memory channel of the two memory devices. In an example, 32 bytes are prefetched for each device memory channel and the bus width of each hardware memory channel is 8-bits. At 710, each hardware memory channel is coupled to a device memory of the pair of RAM devices, such that one hardware memory channel is coupled to one device memory channel. In an example, each device memory channel is coupled to a unique set of column address signals. At 715, a memory controller, or memory controller chiplet, is coupled or connected to the hardware interface, such as by connecting each hardware memory channel to a distinct I/O interface of the memory controller or memory controller chiplet. In an example, the memory controller or memory controller chiplet includes at least four I/O interface for connecting to the hardware memory channels of the hardware interface. Each I/O interface, in some examples, include a set of unique or electrically isolated set of column address pins, such as for transmitting memory access command and address information. In other examples, each I/O interface includes a unique or electrically isolated set of data and clock pins, such as for exchanging data between the memory controller and the pair of memory devices and for synchronizing such exchanges. At 720, the two memory devices are configured to interface with the hardware interface using 8-bit device I/O interfaces, as described herein. In an example, the memory devices are configured to provide the 8-bit device I/O interfaces by physical circuits or interconnects of the hardware interface or by operation of the memory controller according to a specification for the memory devices.

Figure 8:
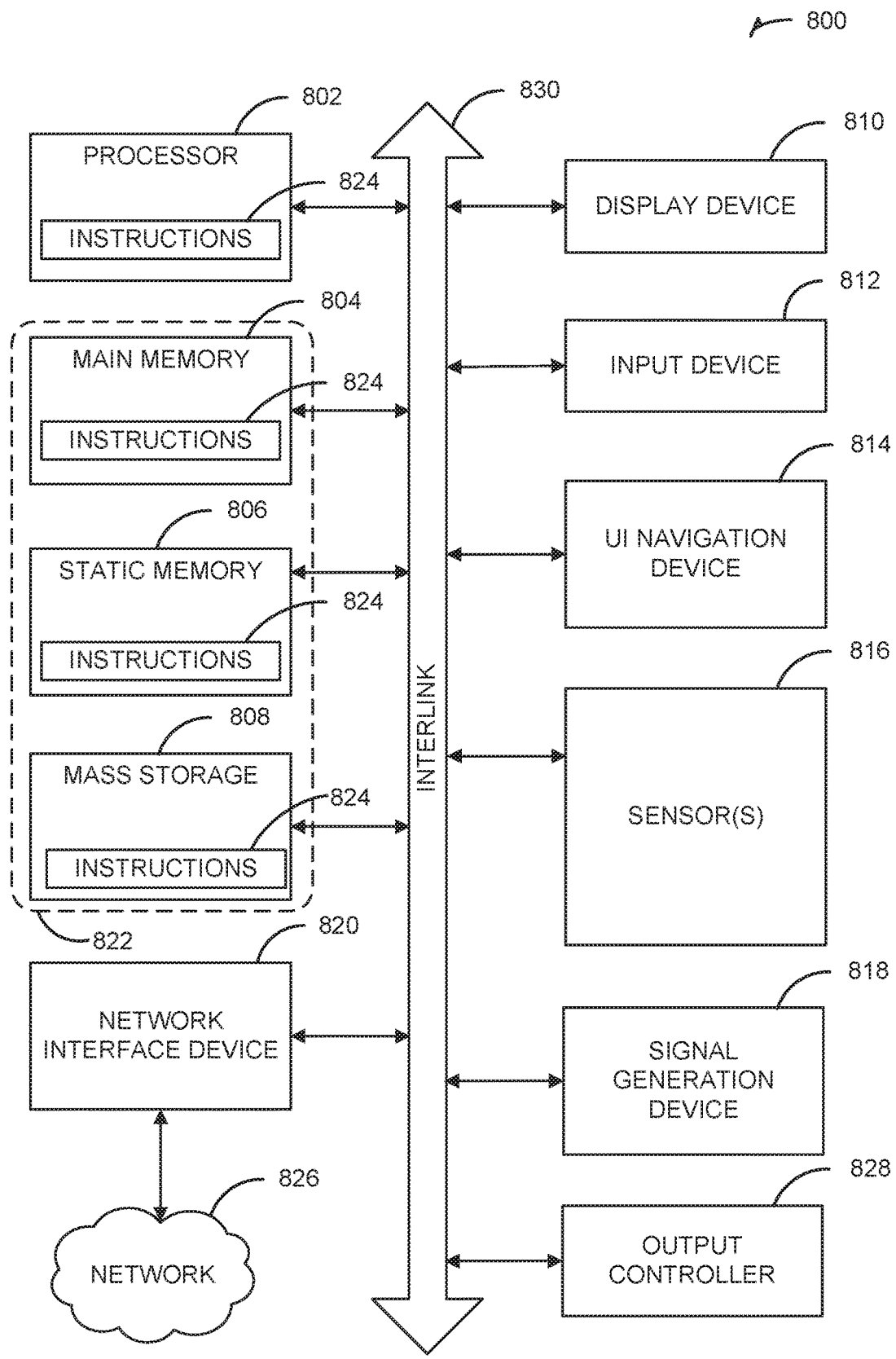
FIG. 8 is a block diagram of an example machine, in accordance with some examples described herein.

FIG. 8 illustrates a block diagram of an example machine 800 upon which any one or more of the techniques (e.g., methodologies) discussed herein may be implemented. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drives, tape drives, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine-readable media 822. While the machine-readable medium 822 is illustrated as a single medium, the term "machine readable medium" may include a single medium or multiple media (e.g., a centralized or distributed database, and/or associated caches and servers) configured to store the one or more instructions 824.

The term "machine-readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 822 may be representative of the instructions 824, such as instructions 824 themselves or a format from which the instructions 824 may be derived. This format from which the instructions 824 may be derived may include source code, encoded instructions (e.g., in compressed or encrypted form), packaged instructions (e.g., split into multiple packages), or the like. The information representative of the instructions 824 in the machine readable medium 822 may be processed by processing circuitry into the instructions to implement any of the operations discussed herein. For example, deriving the instructions 824 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 may include assembly, compilation, or interpretation of the information (e.g., by the processing circuitry) to create the instructions 824 from some intermediate or preprocessed format provided by the machine readable medium 822. The information, when provided in multiple parts, may be combined, unpacked, and modified to create the instructions 824. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

In the foregoing specification, some example implementations of the disclosure have been described. It will be evident that various modifications can be made thereto without departing from the broader scope and spirit of the disclosure as set forth in the following claims. The specification and drawings are, accordingly, to be regarded in an illustrative sense rather than in a restrictive sense. Below is a non-exhaustive list of examples of implementations of the present disclosure.

Example 1 is a chiplet system comprising: a memory controller chiplet including a memory interface circuit configured to couple the memory controller chiplet to first and second memory devices, the memory interface circuit comprising: first and second memory channels having respective data widths, and configured to couple, respectively, first and second input-output (I/O) interfaces of the memory controller chiplet to an interface of the first memory device having a data channel width at least equal to the combined first and second memory channel widths, wherein the first and second memory channels have independent command/address (CA) paths; and third and fourth memory channels having respective data widths, and configured to couple, respectively, third and fourth I/O interfaces of the memory controller chiplet to an interface of the second memory device having a data channel width at least equal to the combined third and fourth memory channel widths, wherein the third and fourth memory channels have independent CA paths, which are further independent from the first and second memory channel CA paths.

In Example 2, the subject matter of Example 1 includes, wherein the first and second memory devices include graphics double data rate (GDDR) devices that are configured to prefetch at least 32 bytes of data responsive to a memory access operation received at the interface of either the first or second memory device.

In Example 3, the subject matter of Example 2 includes, wherein the memory access operation comprises a row-activate command and a column read command.

In Example 4, the subject matter of Examples 1-3 includes, wherein the system further comprises the memory controller chiplet, the memory controller chiplet configured to transmit independently addressed memory access commands over the memory interface circuit to an industry standard memory interface.

In Example 5, the subject matter of Examples 1-4 includes, wherein the memory controller chiplet is configured to issue at least three row activate commands to the first and second memory devices within an activate to activate delay period, wherein each row activate command is addressed to a different bank of memory in the first or second memory devices.

In Example 6, the subject matter of Examples 1-5 includes, wherein the system further comprises a memory chiplet including the first and second memory devices.

In Example 7, the subject matter of Examples 1-6 includes, wherein the memory interface circuit further couples separate clock signals to each independently addressable memory channel.

In Example 8, the subject matter of Examples 1-7 includes, wherein a number of bytes communicated over an interface of the first or second memory device per received memory access operation is half a number of bytes prefetched by the first or second memory device in response to the memory operation received at the interface of the first or second memory device.

Example 9 is a chiplet system comprising: a memory controller chiplet; first and second memory devices configured to couple to an I/O interface of the memory controller chiplet, wherein: each of the first and second memory devices include, two independently addressable memory interfaces for providing access to independent portions of each memory device, and the I/O interface includes at least four independently addressable memory channels for coupling the first and second memory devices to a memory controller chiplet; and an interposer configured to couple each independently addressable memory channel to a separate memory interface of the first and second memory devices; wherein the first and second memory devices are configured to communicate a specified number of bytes over each independently addressable memory interface for each memory access operation received at the independently addressable memory interface, wherein the first and second memory devices are configured to prefetch twice the specified number of bytes per memory access operation received at the independently addressable memory interface.

In Example 10, the subject matter of Example 9 includes, wherein the first and second memory devices include graphics double data rate (GDDR) devices that are configured to prefetch at least 32 bytes of data responsive to a memory access operation received at each independently addressable memory interface.

In Example 11, the subject matter of Example 10 includes, wherein the memory access operation comprises a row-activate command and a column read command.

In Example 12, the subject matter of Examples 9-11 includes, wherein the independently addressable memory interfaces are industry standard GDDR6 memory interfaces, and the memory controller chiplet is configured to transmit independently addressed memory access commands over the IO interface to the industry standard memory interface.

In Example 13, the subject matter of Examples 9-12 includes, wherein the memory controller chiplet is configured to issue at least three row activate commands to the first and second memory devices within an activate to activate delay period, and each row activate command is addressed to a different bank of memory in the first or second memory devices.

In Example 14, the subject matter of Examples 9-13 includes, a memory chiplet including the first and second memory devices.

In Example 15, the subject matter of Examples 9-14 includes, wherein the chiplet system is configured to couple separate clock signals to each independently addressable memory channel using the I/O interface.

Example 16 is a system comprising: first and second memory devices having common address and command signals, wherein each memory device has a first data width and the first and second devices are configured to collectively provide a memory interface having a second data width, the second data width having twice as many bits as the first data width; and memory controller chiplet configured to issue commands to access the first and second memory devices using an I/O interface having four memory channels, wherein the memory controller is configured to issue independently address commands over each memory channel to access independently addressable regions of each memory device.

In Example 17, the subject matter of Example 16 includes, an interpose that is configured to couple a separate chip select signals from the memory controller to each memory device, wherein the memory controller chiplet is further configured to issue two or more independently address commands to access the independently addressable regions of each memory device within an industry standard row-activate to row-activate timing delay period using the chip select signals.

In Example 18, the subject matter of Examples 16-17 includes, wherein the first and second memory devices are GDDR6 memory devices that are configured to operate in an 8-bit mode.

In Example 19, the subject matter of Examples 16-18 includes, wherein the memory interface is an industry standard memory interface.

In Example 20, the subject matter of Examples 16-19 includes, wherein the system further comprises a memory chiplet including the first and second memory devices.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

These non-limiting Examples can be combined in any permutation or combination.

What is claimed is:

1. A system comprising:
    first and second memory devices having common address and command signals, wherein each memory device has a respective first data width, and wherein the first and second devices are configured to collectively provide a memory interface having a second data width, the second data width having twice as many bits as the first data width; and
    a memory controller chiplet includes one or more processors, and is configured to perform memory access operations including a memory read operation comprising issuing read commands to read data from the first and second memory devices using an I/O interface having four memory channels,
    wherein the memory controller is configured to issue independent command/address (C/A) commands over each memory channel to access independently addressable regions of each memory device, wherein the C/A commands of a first memory read operation in a first memory channel comprise,
        at a first time, providing a first row-activate command to the first memory channel, followed by a first read command, and
        at a second time, prior to expiration of an activate-to-activate delay interval initiated with the first row-activate command, providing a second read command to the first memory channel;
    wherein the memory controller is further configured to receive data responsive to read requests, including:
        at a third time, before the second time, receiving a first burst of data responsive to the first row-activate command and the first read command; and
        at a fourth time, after the second time receiving a first burst of data responsive to the first row-activate command and the second read command.

2. The system of claim 1, further comprising an interposer that is configured to couple separate chip select signals from the memory controller to each memory device, wherein the memory controller chiplet is further configured to issue two or more independent address commands to access the independently addressable regions of each memory device within an industry standard row-activate to row-activate timing delay period using the chip select signals.

3. The system of claim 1, wherein the first and second memory devices are GDDR6 memory devices that are configured to operate in an 8-bit mode, and wherein the activate-to-activate delay interval is defined by a GDDR6 device specification.

4. The system of claim 3, wherein the memory controller is further configured to perform a second memory read operation from same memory channel of the first memory read operation, comprising:
    at a fifth time, after expiration of the activate-to-activate delay interval initiated with the first row-activate command, providing a second row-activate command followed by a third read command; and
    at a sixth time, prior to expiration of a second activate-to-activate delay interval initiated with the second row-activate command and defined by the GDDR6 device specification, providing a fourth row-activate command.

5. The system of claim 1, wherein the memory interface is an industry standard memory interface.

6. The system of claim 1, wherein the system further comprises a memory chiplet including the first and second memory devices.

7. The system of claim 1, wherein the controller operations further comprise receiving a second burst of data responsive to the first read request, before receiving the first burst of data responsive to the second read request at the fourth time.

8. A chiplet system comprising:
    a memory controller chiplet including a memory interface circuit configured to couple the memory controller chiplet to first and second memory devices, the memory interface circuit comprising:
        first and second memory channels having respective data widths, and configured to couple, respectively, first and second input-output (I/O) interfaces of the memory controller chiplet to an interface of the first memory device having a data channel width at least equal to combined first and second memory channel widths, wherein the first and second memory channels have respective associated independent first and second command/address (CA) paths; and
        third and fourth memory channels having respective data widths, and configured to couple, respectively, third and fourth I/O interfaces of the memory controller chiplet to an interface of the second memory device having a data channel width at least equal to the combined third and fourth memory channel widths, wherein the third and fourth memory channels have respective associated independent third and fourth CA paths, which are further independent from the first and second memory channel CA paths;
    wherein the memory controller chiplet includes one or more processors, and is configured to perform operations including performing a first memory read operation, including,
        providing independent CA signals to a selected channel of the at least four memory channels, through the associated CA path, including,
            at a first time, providing a first row-activate command, followed by a first read command to the selected channel, and
            at a second time, prior to expiration of an activate-to-activate delay interval initiated with the first row-activate command, providing a second read command to the selected channel;
        at a third time, before the second time, receiving a first burst of data responsive to the first row-activate command and the first read command; and
        at a fourth time, after the second time, receiving a first burst of data responsive to the first row-activate command and the second read command.

9. The chiplet system of claim 8, wherein the first and second memory devices include graphics double data rate (GDDR) devices that are configured to prefetch at least 32 bytes of data responsive to a memory access operation received at the interface of either the first or second memory device.

10. The chiplet system of claim 8, wherein the memory controller chiplet is configured to transmit independently addressed memory access commands over the memory interface circuit to an industry standard memory interface.

11. The chiplet system of claim 8, wherein the memory controller chiplet is configured to issue at least three row-activate commands to the first and second memory devices within an activate to activate delay period, wherein each row-activate command is addressed to a different bank of memory in the first or second memory devices.

12. The chiplet system of claim 8, wherein the system further comprises a memory chiplet including the first and second memory devices.

13. The chiplet system of claim 8, wherein the memory interface circuit further couples separate clock signals to each independently addressable memory channel.

14. The chiplet system of claim 8, wherein a number of bytes communicated over an interface of the first or second memory device per received memory access operation is half a number of bytes prefetched by the first or second memory device in response to the memory operation received at the interface of the first or second memory device.

15. The chiplet system of claim 8, wherein the memory controller is further configured to perform a second memory read operation from the first memory channel of the first memory read operation, comprising:
at a fifth time, after expiration of the activate-to-activate delay interval initiated with the first row-activate command at the first time, providing a second row-activate command to the first memory channel followed by a third read command; and
at a sixth time, prior to expiration of a second activate-to-activate delay interval initiated with the second row-activate command at the fifth time, providing a fourth read command to the first memory channel.

16. The chiplet system of claim 8, wherein the controller operations further comprise receiving a second burst of data responsive to the first read request, before receiving the first burst of data responsive to the second read request at the fourth time.

17. A chiplet system comprising:
a memory controller chiplet;
first and second memory devices configured to couple to an I/O interface of the memory controller chiplet, wherein:
each of the first and second memory devices include two independently addressable memory interfaces for providing access to independent portions of each memory device, and
the I/O interface includes at least four independently addressable memory channels for coupling respective portions of the first and second memory devices to the memory controller chiplet, wherein each memory channel includes a respective associated independent command/address (CA) path; and
an interposer configured to couple each independently addressable memory channel to a separate memory interface of the first and second memory devices;
wherein the first and second memory devices are configured to communicate a specified number of bytes over each independently addressable memory interface for each memory access operation received at the independently addressable memory interface, wherein the first and second memory devices are configured to prefetch twice the specified number of bytes per memory access operation received at the independently addressable memory interface;
wherein the memory controller chiplet includes one or more processors, and is configured to perform memory access operations including performing a first memory read operation, including:
providing independent CA signals to a selected memory channel of the at least four memory channels, through the associated independent CA path, including,
at a first time, providing a first row-activate command to the selected memory channel, followed by a first read command, and
at a second time, prior to expiration of an activate-to-activate delay interval initiated with the first row-activate command, providing a second read command to the selected memory channel;
at a third time, before the second time, receiving a first burst of data responsive to the first row-activate command and the first read command; and
at a fourth time, after the second time, receiving a first burst of data responsive to the first row-activate command and the second read command.

18. The chiplet system of claim 17, wherein the first and second memory devices include graphics double data rate (GDDR) devices that are configured to prefetch at least 32 bytes of data responsive to a memory access operation received at each independently addressable memory interface.

19. The chiplet system of claim 17, wherein the independently addressable memory interfaces are industry standard GDDR6 memory interfaces, and the memory controller chiplet is configured to transmit independently addressed memory access commands over the I/O interface to the industry standard memory interface.

20. The chiplet system of claim 17, wherein the memory controller chiplet is configured to issue at least three row-activate commands to the first and second memory devices within an activate-to-activate delay period, and each row-activate command is addressed to a different bank of memory in the first or second memory devices.

21. The chiplet system of claim 17, further comprising a memory chiplet including the first and second memory devices.

22. The chiplet system of claim 17, wherein the chiplet system is configured to couple separate clock signals to each independently addressable memory channel using the I/O interface.

23. The chiplet system of claim 17, wherein the memory controller is further configured to perform a second memory read operation from the selected memory channel of the first memory read operation, comprising:
at a fifth time, after expiration of the activate-to-activate delay interval initiated with the first row-activate command, providing a second row-activate command to the selected memory channel followed by a third read command to the selected memory channel; and
at a sixth time, prior to expiration of a second activate-to-activate delay interval initiated with the second row-activate command at the fifth time, providing a fourth row-activate command to the selected memory channel.

* * * * *